United States Patent [19]

Josse

[11] 4,135,189
[45] Jan. 16, 1979

[54] RANDOM FREQUENCY RADAR SYSTEM

[75] Inventor: Paul Josse, Paris, France

[73] Assignee: Compagnie Generale de Telegraphie Sans Fil, France

[21] Appl. No.: 424,171

[22] Filed: Jan. 4, 1965

[30] Foreign Application Priority Data

Jan. 9, 1964 [FR] France .............................. 64.959768

[51] Int. Cl.² ............................................. G01S 7/36
[52] U.S. Cl. .................................. 343/18 E; 343/7.5;
343/17.2 R
[58] Field of Search ................... 343/7, 14, 17.5, 17.1, 343/7.5, 17.2 R, 18 E

[56] References Cited

U.S. PATENT DOCUMENTS

| 3,050,726 | 8/1962 | Laurent .................................. 343/7.5 |
| 3,281,837 | 10/1966 | Van Hijfte ............................. 343/7.5 |
| 3,916,406 | 10/1975 | Miller et al. .......................... 343/7 A |
| 3,981,012 | 9/1976 | Brault et al. ...................... 343/17.2 R |

*Primary Examiner*—T.H. Tubbesing
*Attorney, Agent, or Firm*—Haseltine, Lake & Waters

EXEMPLARY CLAIM

1. A variable frequency pulse radar system comprising: a transmitter, a receiver and means for initiating successive radar transmission-reception cycles at successive frequencies; listening means for picking up, while one of said radar cycles is running at a given carrier frequency, signals on the air at various frequencies different from the actual radar cycle frequency; means for selecting one of said frequencies; and means for tuning said radar transmitter and said radar receiver during the next radar cycle to said one selected frequency.

8 Claims, 6 Drawing Figures

RANDOM FREQUENCY RADAR SYSTEM

The present invention relates to random frequency radar systems.

More particularly it relates to random frequency radars in which a listening system is used for determining the presence of jamming signals. Known listening systems are quite effective for anti-jamming purpose. However, since, in general, listening takes place after transmission, the transmission frequency is selected without taking into account the received information, such information being used only as a criterion for received echoes and, when appropriate, for bringing about a change of transmitter frequency. A considerable loss or radar information may thus arise.

However, in some improved systems, listening takes place before transmission, but since the listening circuits are in part common with the reception circuits, the possible number of samplings of the watch frequencies is limited, the listening taking place at the expense of the duration of reception.

It is an object of the invention to provide a system free of these restrictions.

According to the present invention, two separate channels are used for listening in and for the actual radar reception, and, in particular, two local oscillators, serve respectively for listening in and for reception, end work simultaneously; the reception local oscillator supplies the reference frequency for reception, the other being used for exploring the radar band in order to determine the unjamming frequency of the next transmission.

The listening in takes place prior to a transmission without reducing the reception time for the previous transmission; the number of samplings is limited, for a given transmission repetition frequency, only by the time required for sampling.

According to one preferred mode of realisation of the invention, the listening arrangements include an output device whose threshold is automatically adjusted.

For a better understanding of the invention and to show how the same may be carried into effect, reference will be made to the drawings appended to the following description and wherein.

Figure 1:
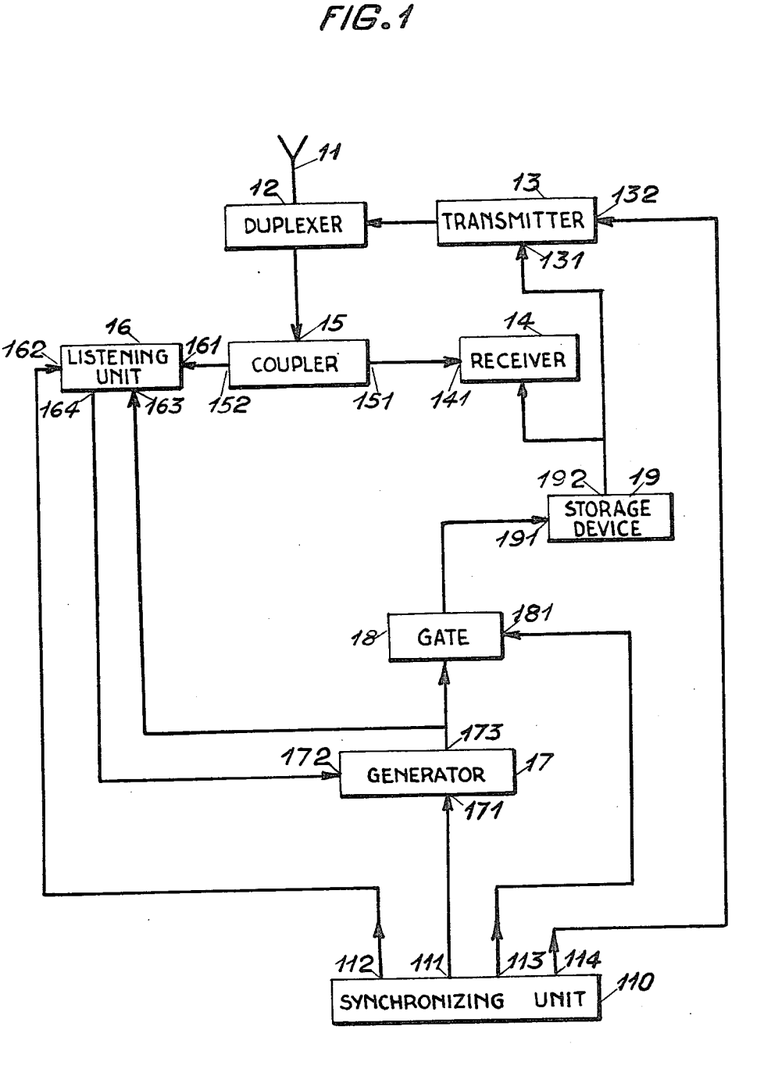
FIG. 1 is the circuit diagram of a radar equipment according to the invention.

The radar system circuit shown in FIG. 1 comprises a receiving antenna 11, a duplexer 12 and a transmitting unit 13. The transmitting unit includes a master oscillator. These components are conventional and interconnected in a conventional manner.

A receiver 14 includes a local oscillator which oscillates at a frequency differing, as known in the art, by a fixed value from that of the master oscillator. Input 141 of the receiver is connected to the reception output of duplexer 12 through a coupler 15 with two outputs 151 and 152, output 151 being connected to input 141. This coupler distributes the energy, picked up by antenna 11, between receiver 14 and the listening unit 16 whose signal input 161 is connected to output 152. Device 15 may be, for example, a conventional directional coupler or a hybrid junction. The listening-in unit 16 includes a variable frequency local oscillator. A generator 17 delivers at its output 173 signals of random amplitude, so as to control, directly or indirectly, the respective frequencies of the three variable oscillators respectively included in the transmitter unit 13, the reception unit 14 and the listening-in unit 16. Generally it will be preferable, though not essential, to use three oscillators of the same kind so that the output signals of generator 17 may simply be applied to the control inputs of these oscillators. For example, the three oscillators will be "Carcinotron" tubes and generator 17 will generate a random but broadly cyclic voltage which will be used to control, after amplification and voltage transpositions, the frequency of the above three oscillators.

In all cases generator 17 is of the controlled type i.e. such that its output varies only on receipt of an external order.

While generator 17 is shown in the drawing as having two control inputs 171 and 172, this has been done only for the clarity of the drawing. Actually control impulses may be applied to a single control input.

The signals provided at output 173 are applied to the frequency control input 163 of the oscillator of the listening unit 16. They are also applied, through a gate 18, to the input 191 of a storage device 19, whose output 192 is connected to the respective frequency control inputs of the master oscillator of transmitter 13 and of the local oscillator of receiver 14.

The circuit of FIG. 1 also comprises a synchronising unit 110 whose outputs 111, 112, 113, 114 are respectively connected to input 171 of generator 17, to a blocking control input 162 of the listening receiver 16, to the control input of gate 18, and to an unblocking control input 132 of transmitter unit 13. Output 164 of the listening receiver is connected to the control input 172 of generator 17.

Listening receiver 16 generally includes a threshold device so as to deliver a signal at its output 164 only if the signals applied to its input, instantaneous or integrated over a certain time interval, exceed a given level.

Radar receiver 14 and listening-in receiver 16, whose circuits are totally independent, operate simultaneously.

Let the system be considered in actual operation, at a time To at which a pulse is delivered at the output 111 of the synchronising unit 110, receiver 14 being assumed to operate at that instant on a frequency corresponding to a transmission frequency fo, defined by the signal stored in the storage device 19; generator 17 delivers at that instant at its output 173 a fresh signal, different from that stored in the storage device 19, and which, when applied to input 163, changes the listening frequency of receiver 16. The latter is blocked by the signal applied to its input 162 for the time required for stabilising its local oscillator on the new frequency; this signal also, if necessary, resets to zero the integrator incorporated in the receiver 16.

Then, while the reception goes on normally, there comes a listening phase in the course of which listening receiver 16 collects only the spurious signals since its frequency is controlled by the new output signal of generator 17, whereas the last transmission was controlled by the previous signal. Receiver 16 supplies, or fails to supply, depending on the level of the spurious signals of the corresponding frequency on the air, a synchronising signal to input 172 of generator 17.

If it supplies such a signal, the output signal of generator 17 is again changed and a fresh listening phase begins.

If no signal is supplied to generator 17, the signal appearing at its output 173 remains unaltered up to the end of the reception phase. Before this, synchronising device 110 supplies at its output 113 a pulse which actuates gate 18. This pulse appears a time T after the pulse supplied at its output 111, sufficient to permit a substantial number of samplings.

Storage device 19 stores the output signal of generator 17 and applies it to the respective frequency control inputs of the master oscillator of transmitter 13 and of the local oscillator of the receiver 14.

In a preferred embodiment, the master oscillator and the high-frequency amplifier in the transmitter high-frequency stage are both blocked during the listening frequency change and the transmission phase has two stages:

(a) unblocking the master oscillator and tuning the latter to the frequency defined by the signal stored in store 19;

(b) short operating period of the amplifier finally resulting in the transmission.

The tuning of the master oscillator to the frequency fo can be made more accurate by means of an automatic frequency control fed by the master oscillator and the local oscillator of the receiver.

Similarly, greater precision can be obtained in making the local oscillator and/or the master oscillator frequency correspond to the selected listening-in frequency, by means of an automatic frequency control fed, on the one hand, by the local oscillator of the listening-in receiver and, on the other, by the radar receiver local oscillator or the master oscillator, which arrangement supplies a signal correcting the value of the signal to be stored in store 19.

The arrangement just described can be varied in many ways; in particular it is independent of the mode of realization of the random control generator and circuits 110 and 19 can be devised in various ways, obvious to those skilled in the art.

By way of example, and with reference to FIG. 2, a detailed embodiment of the invention will now be described as applied to the case of a random frequency radar system including, as variable oscillators, "Carcinotron" tubes whose frequency is, as well known, a practically linear function of the control voltage.

All durations are expressed in microseconds.

Figure 2:
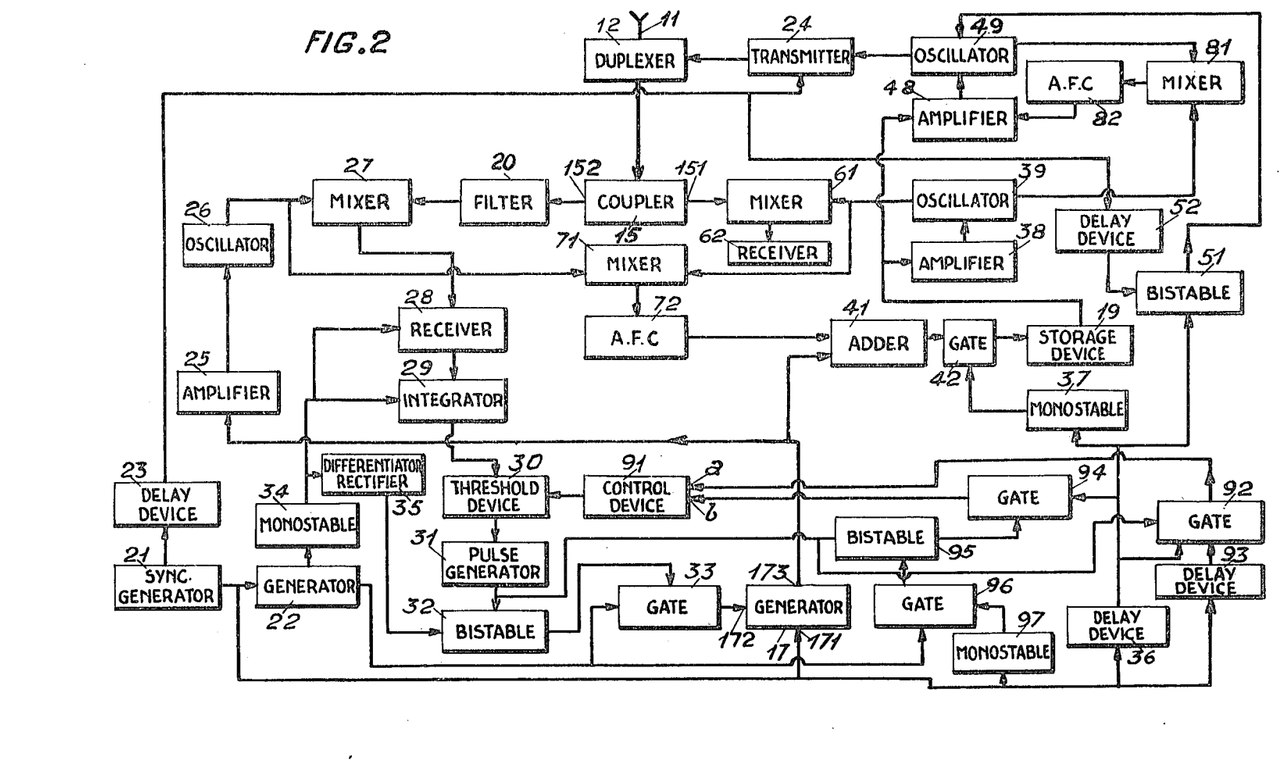
FIG. 2 is the detailed circuit diagram of a radar system according to the invention.

The circuit of FIG. 2 comprises, as that of FIG. 1, an antenna 11, a duplexer 12, a coupler 15, a random frequency generator 17 and a storage device 19.

A generator 21 generates synchronising signals of a period. To, equal to the radar repetition period, which brings about a systematic change of the output voltage from generator 17, whatever the results of the preceding listening may be. Henceforth the term "origin" synchronising signals" will be used to denote the signals supplied by generator 21.

The output signals of generator 21 drive generator 17 and the phase control input of a generator 22 which supplies synchronizing signals of a 50 $\mu$s, period, and feed a delay device 23 with a delay $\tau$, equal to T + 50 + $\theta_2$ ($\theta_2$ will be defined further on) whose output is connected to the control input of the HF amplifier (not shown) of transmitter 24.

The output voltage from generator 17 is applied, on the one hand, to the input of an amplifier 25, whose output is connected to the control input of a listening-in oscillator 26, and, on the other, to the first input of an adder 41, whose output is connected to the signal input of a gate 42, the output of which is connected to the input of store 19. Listening-in oscillator 26 feeds the first input of a mixer 27 whose other input is connected to the output of a filter 20 fed by output 152 of coupler 15. Mixer 27 feeds the listening-in receiver 28, whose output is connected to an integrator 29. The output from the latter is connected to the input of an adjustable threshold device 30. The output signals of device 30 are transformed in a pulse modulator 31 into synchronising pulses, or "listening sync", which are applied to the tripping input of a bistable multivibrator 32, whose reset input receives the synchronising signals from generator 22 delayed, in a way which will be defined further on, by a time $\theta_1$ of about 15 $\mu$s. The output of multivibrator 32 is applied to actuate a normally deenergized gate 33 whose signal input receives the signals, repeated with a 50 $\mu$s period from generator 22, and whose output is connected to input 172 of the random voltage generator 17.

These 50 $\mu$s repetition period synchronising pulses are transformed to square signals with the same origin and a duration $\theta_1$ in a monostable multivibrator 34, and simultaneously applied to the blocking input of listening-in receiver 28 and to the zero reset input of integrator 29. The pulses applied to the first input of multivibrator 32 correspond to the trailing edge of these square signals and are here obtained by differentiation and rectification, at 35, of these signals. In this way, the listening-in receiver is blocked during the time corresponding to the stabilisation of the "Carcinotron" tube 26, and gate 33, which is inoperative at the instant the listening-in receiver is freed, is actuated, as the next synchronising pulse arrives from generator 22, only if a jamming signal of sufficiently high level has been received, so causing a selection of a fresh listening-in frequency.

Gate 42 which controls the input of store 19 is controlled by the origin synchronising pulses, delayed by T by delay device 36 and transformed, in monostable multivibrator 37, to square signals of duration $\theta_2$ of about 200 $\mu$s.

Ignoring for the present the second input of adder 41, the signal recorded in store 19 is the value of the output voltage from generator 17 at instant T. This value is applied to amplifier 38 of the local oscillator 39 of the receiver and to amplifier 48 of the master oscillator 49. The latter is unblocked by the output signal from bistable multivibrator 51 which is triggered into operation at the same instant as monostable multivibrator 37 by the "origin synchronising signal", delayed by T at 36, and which is reset to zero by the signal which unblocks transmitter 24, delayed by a few microseconds (about 10) in a delay device 52. The master oscillator is thus freed much before the transmitter itself (exactly $\tau$ - T before it), this providing the time necessary for stabilising and tuning its frequency, and remains in that condition up to about 10 $\mu$s after transmission has taken place.

It will be noted that the delay $\tau$ has been made longer by 50 $\mu$s than the time T + $\theta_2$. Also, time T will never exceed the radar repetition period, To less 50 $\mu$s, in order to give time for deionisation of the duplexer before the reception phase.

Local oscillator 39 feeds in a conventional manner the input mixer 61 of the actual receiver 62, the second mixer input being connected to the output 151 of coupler 15.

A first frequency setting device is provided between the local oscillator and the listening-in local oscillator; it consists of a mixer 71 fed by these two oscillators and connected to an automatic frequency control circuit (A.F.C.) 72 which delivers a correction voltage to the second input of adder 41.

A second frequency setting device is provided between the master oscillator and the local oscillator, including also a mixer 81, fed by these two oscillators and an automatic frequency control device 82, which delivers a correction voltage directly to the input of amplifier 48. Although shown separately, the two inputs of amplifier 48 may be joined, an adder being inserted ahead of that point.

The method best suited for anti-jamming would consist in making a systematic search over the whole of the radar band, storing the various jamming levels and setting the transmitter on the frequency to which corresponds the lowest level. An arrangement of this kind has the drawback of a highly complex design and complicated operation. As opposed to this, the use of a manually adjustable threshold is very simple but its performance is poor. This is due to the fact that, if the threshold is set at too low a value, the search cycle goes on without any frequency being retained, apart from the one already in use. If it is set too high, the first selected frequency satisfies the jamming criterion defined by the threshold but not necessarily corresponds to the least jammed frequency in the radar band. Manual adjustment of this threshold would not permit adaptation to rapid jamming changes.

Consequently, the threshold arrangement 30 in FIG. 2 includes an automatic adjustment of the threshold level, controlled by a device 91 with two inputs a and b which respectively control the raising of the threshold level and the lowering of this level. As will be seen further on, this arrangement ensures a better utilisation of the listening-in receiver.

The signal causing the raising of the threshold level is obtained from the pulse generator 31 through a gate 92 with two control inputs, which is made operative during the last 50 microseconds of each cycle of generator 17. To this end gate 92 includes, for example, an actuating control input connected to generator 21 through a delay device 93 with a delay T − 50 and a desabling control input connected to the output of delay device 36 of delay T.

The signal causing the lowering of the threshold level is derived from the origin synchronisation signal delayed by T at 36, and is allowed to pass only if a gate 94, controlled by a bistable multivibrator 95, is operative. Multivibrator 95 is triggered by the 50 μs repetition period synchronisation signal, supplied to it through a gate 96, kept operative by the output signal from a monostable multivibrator 97 whose unstable state duration is equal to any value between T − 100 and T − 50 and which is triggered by the origin synchronisation signal. Multivibrator 95 is therefore triggered by the 50 μs synchronisation signal and reset to zero, if jamming is present, by the listening-in synchronisation signal. If the tested frequency is satisfactory, no signal appears at the output of generator 31 and multivibrator 95 remains in the set position up to the next repetition period; in particular, at time T gate 94 is operative and input b receives a signal which controls the lowering of the threshold. This procedure remains valid for the listening in interval started by the 50 μs repetition period synchronising signal delivered at time T − 100, but is no longer valid for that started the same signal delivered at time T − 50, for gate 96 is then disabled.

Consequently, if the threshold is set too high, which results in the absence of any signal at the input 172 of generator 17, which would then not complete its cycle, the signal appearing at time T at terminal b causes a lowering of the threshold, this being repeated at each repetition period until a signal appears at the output of synchronisation generator 31. But if a signal appears at the last tested frequency, during a cycle T of generator 17, the threshold will be automatically raised by the signal applied at a.

Figure 3:
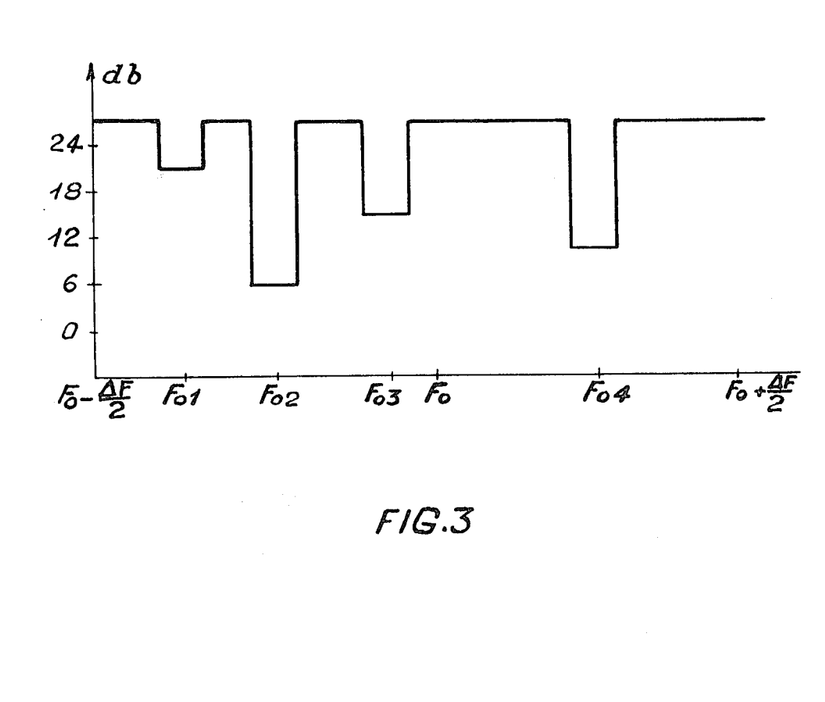
FIG. 3 is a graph shown for a better understanding of the function performed by a portion of the circuit of FIG. 2.
Figure 4:
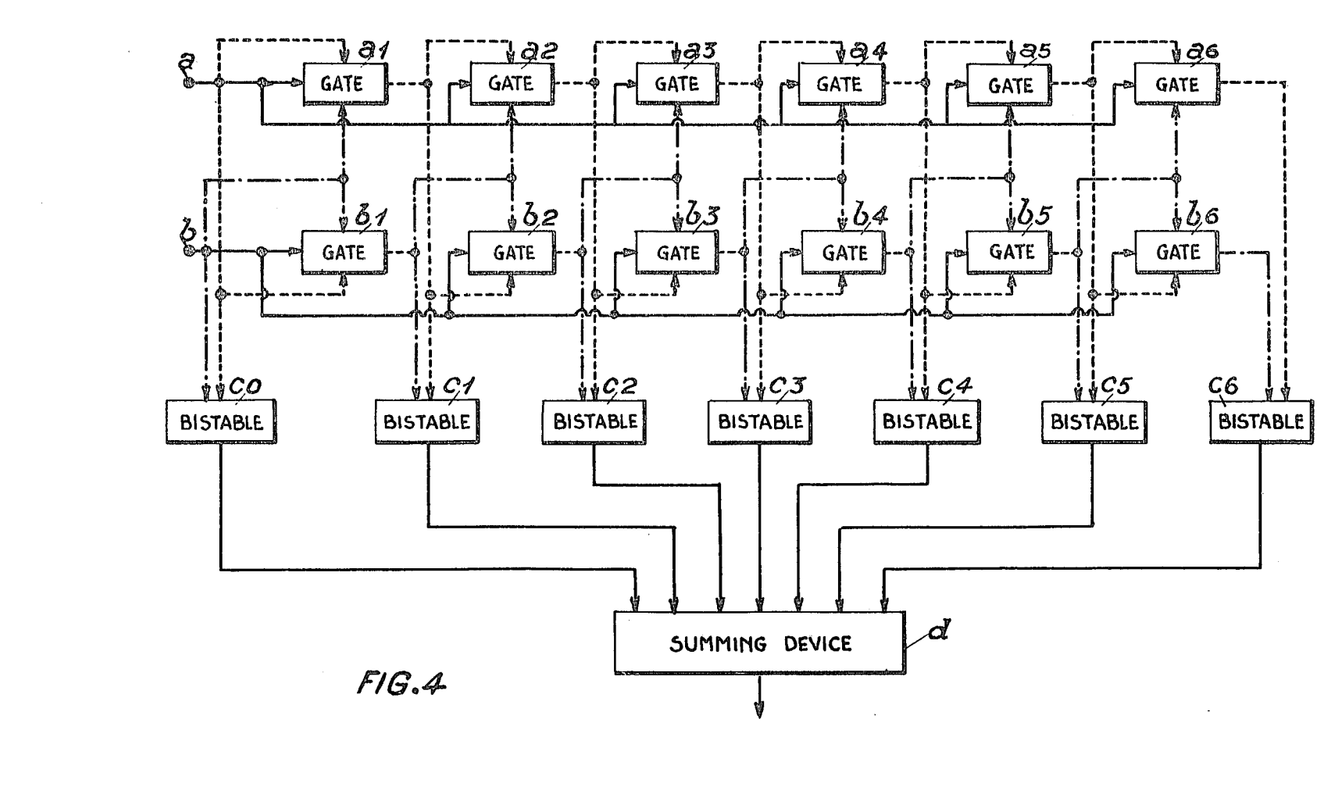
FIG. 4 is a preferred embodiment according to the invention of a circuit portion.

FIG. 3 helps to obtain a better understanding of the principle of this automatic adjustment and FIG. 4 shows by way of example a threshold control arrangement according to the invention.

FIG. 3 shows, as a function of the various frequencies which may be used, the received jamming energy, expressed in decibels, in the case of a jammer modulated in amplitude or of a number of jammers with poor frequency overlap. Fo is the mean transmitter frequency and ΔF the possible frequency excursion.

It is assumed that four transmitting frequencies Fo1, Fo2, Fo3 and Fo4 are available, and that the threshold of device 31 is adjusted initially at 18 dB and can be varied by steps of 6 db.

Three cases can occur:

(1) The threshold is set too high, e.g. at 18 dB. Generator 17 will come to a stop on that of the frequencies Fo2, Fo3, Fo4 which appears first during the search cycle, but which does not necessarily correspond to minimum jamming level. In any case generator 17 does not complete its cycle and this criterion is used to lower by one step, by means of the signal applied to input b of device 91, the threshold for the next cycle say at 12 dB. And so on, until the 6 dB threshold corresponding to frequency Fo2 is reached.

(2) The threshold level is again correct.

Let, for example, a 6 dB threshold be considered. There is no frequency with a lower jamming level, and generator 17 will again define the frequency Fo2 which is the last in the cycle. In this case synchronisation generator 31 supplies no signal on this last position and the threshold remains unchanged for the next repetition, neither input a nor input b having received a signal.

(3) The threshold level is set too low, which may be caused by a quick change in jamming conditions).

Consider a 0 dB case in the figure. No frequency is available during a complete cycle of generator 17, and the latter returns to the previous position where the jamming level is then sufficiently high to trigger the listening in synchronisation generator 31. In this case the signal which appears at input a raises the threshold by one step, i.e. by 6 dB.

FIG. 4 shows one embodiment of circuit 91 according to the invention. In accordance with the example of FIG. 3, it will be assumed that a seven-step threshold is available.

In this case signals which appear at input terminals a and b are respectively applied to the signal inputs of six gates a1 to a6 and of six gates b1 to b6.

Gates ai (i = 1, 2 ... 6) and bi (i = 1, 2 ... 6) are identical, each having an opening control input (shown above each gate in the figure) and a closing control input (shown below each gate in the figure). They are respectively connected in cascade, i.e. the output of each gate ai (for i not greater than 5) is connected to the opening control input of gate ai + 1 and to the closing control input bi + 1, and conversely for the outputs of gates bi.

Gate a1 is directly opened i.e. actuated by the signals arriving at a, and closed, i.e. disabled, by the signals arriving at b; and, conversely, gate b1 is opened by signals at b and closed by those arriving at a.

Further, the time constants for the opening of these gates are such that when the controlled signal (for passing) and the opening signal occur at the same instant, there will be no transmission.

Seven bistable multivibrators co, c1 ... c6 have respectively two control inputs respectively connected to the outputs of gates ai and bi of equal rank, multivibrator co being directly connected to inputs a and b.

To control signals coming from terminal b and gate bi there corresponds a zero output voltage for multivibrator ci, and to those coming from terminal a and gate ai a voltage V . A summing device d, connected to these multivibrators, supplies the threshold voltages 0 ... V ... 6 V.

As an example, it will be assumed that initially all the gates are closed and multivibrator ci is in the position for which no output voltage is supplied. With this assumption it is possible to simplify the reasoning, but one can start from any position.

In the following "sync a" and "sync b" represent the signals applied to terminals a and b.

1st condition: threshold level raising control signal.

"sync a" opens gate a1 (without passing through), closes gate b1 and trips multivibrator co into the "V" position, i.e. the position for which an output voltage V appears resulting in a threshold of V.

2nd condition: threshold level raising signal.

"sync a" passes through gate a1, opens gate a2, closes gate b2 and trips multivibrator c1, resulting in a threshold of 2 V.

3nd condition: threshold level raising control signal.

"sync a" through gates a1 and a2, closes gate b3 opens gate a3, trips multivibrator c2, resulting in a threshold of 3 V.

4th condition: threshold level raising control signal.

"sync a" passes through gates a1, a2 and a3, closes gate b4, opens gate a4, triggers multivibrator c3, resulting in a threshold of 4 V.

5th condition: threshold level lowering control signal.

"sync b" opens b1, closes a1 and resets co to position 0, i.e. the position for which no output voltage appears, resulting in a threshold of (4 V − V) = 3 V.

6th condition: threshold level lowering control signal.

"sync b" passes through gate b1 opens gate b2, closes gate a2, and resets multivibrator c1, resulting in a threshold of (3 V − V) = 2 V.

7th condition: threshold level raising control signal.

"sync a" opens gate a1, closes gate b1, trips multibrator co resulting in a threshold of (2 V + V) = 3 V.

And the operation continues according to the orders given.

Figure 5:
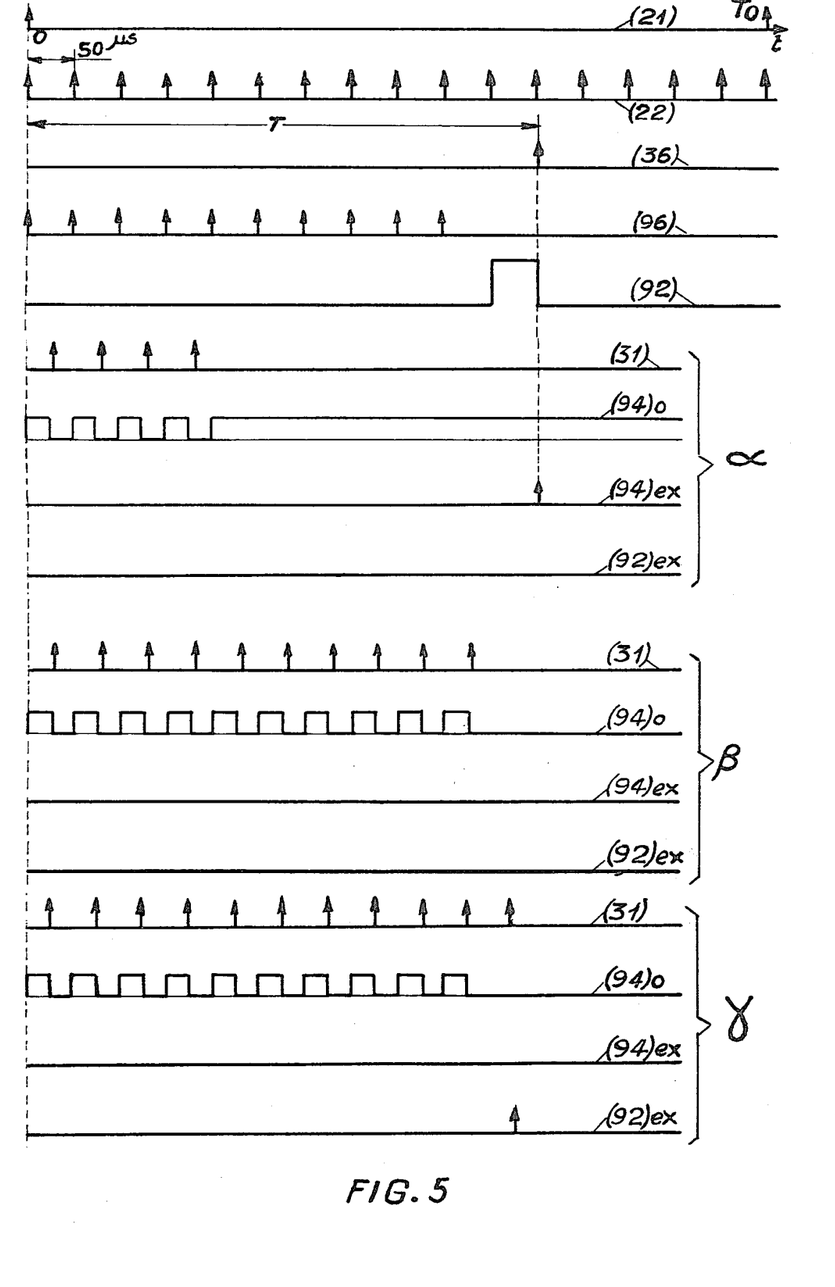
FIG. 5 is a diagram showing the signal sequence at different significant points of the circuits.

FIG. 5 shows against time t, as abscissa, (taking for the time origin, i.e. for t = 0, the instant when an origin synchronising pulse from generator 21 is supplied):

at (21), the pulses supplied by synchronisation generator 21, whose period To is that of the radar transmissions;

at (22), the pulses supplied by unit 22, of 50 μs period, at (36), the pulses at the output of delay line 36, at (96), the pulses at the output of gate 96, at (92), the state of gate 92, the pulse corresponding to the opening of the gate.

At α, β, and γ, FIG. 5 respectively shows three particular cases of operation of the threshold control system; diagram α corresponding to the case when the listening-in frequency at instant t = T − 100 (the fifth in the figure, see below (31) does not give rise to a signal at the output of device 31; diagram β corresponds to the case when it is the penultimate listening-in frequency (time T − 100) that does not give rise to a signal at the output of 31; diagram γ corresponds to the case when all the available listening-in frequencies are jammed.

In all three cases there are shown:

at (31), the pulses at the output of device 31;

at (94)o, the state of gate 94, the upper level of the line indicating that the gate is open;

at (94) ex, the signals at the output of gate 94;

at (92) ex, the signals at the output of gate 92.

It will be noted that, in case α, a signal causing the lowering of the threshold level appears at the output of gate 94 at instant t = T;

in case β the threshold is not changed for the next repetition period (no signal at outputs 96 or 94);

and in case γ a signal causing the raising of the threshold level appears at instant t = T.

Figure 6:
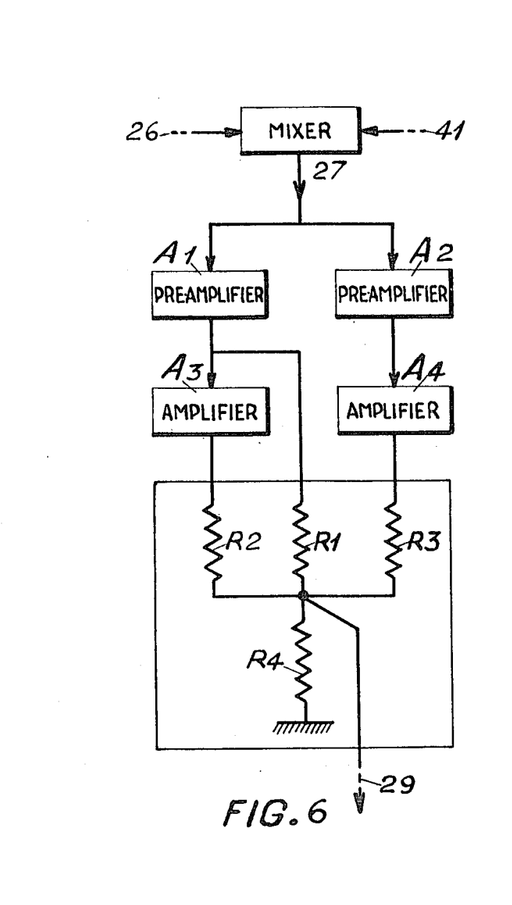
FIG. 6 shows one embodiment of a listening-in receiver belonging to the system of FIG. 2.

FIG. 6 shows one example of a listening-in receiver specially suited for the case when the radar receiver — which in any case is sensitive to transmission signals of frequency fo — also receives the signals, at the image frequency f'o corresponding to frequency fo.

More precisely, designating by fo and f1 the associated variable frequencies of the master oscillator and of the local oscillator of the radar receiver, f1 being defined by fi = f1 − fo where fi is the radar receiver intermediate frequency, for example equal to 30 Mc/s, the image frequency is defined by f'o = fo + 2 fi.

The receiver may also be jammed by signals at frequency f'o, and the listening-in receiver will also have to be sensitive to that frequency during the listening cycle. With f2 for the frequency of the listening-in receiver oscillator and f'i = fo − f2 for the intermediate frequency of the listening in receiver, f'i being, for example, 180 Mc/s, this latter receiver will have to be associated with an additional circuit tuned to frequency f'o, i.e. having an intermediate frequency f''i such that f''i = f'o − f2, that is f''i = f'i + 2 fi (= 240 Mc/s with the above assumed values for f'i and fi).

The receiver shown in FIG. 6 has two circuits connected in parallel between the output of mixer 27 and the input of integrator 29, each of these circuits comprising in series a pre-amplifier A1, A2 and an amplifier A3, A4 tuned to the same corresponding intermediate frequency (180 Mc/s for A1 and A3; 240 Mc/s for A2 and A4 in the same case of the above numerical example).

Amplifiers A3 and A4 are preferably not connected directly to the input of integrator 29, but respectively through resistances R2 and R3 which, with a resistance R1 connected to the output of preamplifier A1 and a resistance R4 connected to ground, form a weighted summation circuit, depending on the characteristics of the radar receiver (degree of image frequency suppression, and saturation level of wide-band circuits, if any).

Further, the listening-in receiver has been made practically insensitive to the receiver 28 image frequency f'2 = f2 − 180 Mc/s by the insertion of a high-pass filter 20 between coupler 15 and mixer 27.

The invention is of course not restricted to the embodiments described and which are given only by way of example.

In particular, in the circuit of FIG. 2 the various circuits built up by the combination of a multivibrator and a gate can be replaced by any system allowing a pulse to pass through during a specified interval.

Also, in order not to lower the signal-to-noise ratio of the radar receiver by dividing the power picked up between the listening in receiver and the normal radar receivers, a low-noise UHF amplifier may be inserted between duplexer 12 and coupler 15.

What is claimed, is:

1. A variable frequency pulse radar system comprising:
   a transmitter, a receiver and means for initiating successive radar transmission-reception cycles at successive frequencies; listening means for picking up, while one of said radar cycles is running at a given carrier frequency, signals on the air at various frequencies different from the actual radar cycle frequency; means for selecting one of said frequencies; and means for tuning said radar transmitter and said radar receiver during the next radar cycle to said one selected frequency.

2. A radar system comprising:
   transmitting means for transmitting radar pulses having a variable first carrier frequency, said frequency being constant for each pulse;
   first receiving means for receiving said pulses as echo pulses reflected by targets;
   second receiving means for picking up jamming signals on the air at a given frequency, said second receiving means having an output; means for simultaneously making operative said first and second receiving means;
   and means, controlled by said output, for making operative said transmitting means at said given frequency in the absence of any signal at said output and for tuning said second receiving means to a frequency different from said given frequency in the presence of a signal at said output.

3. A pulse radar system comprising:
   radar transmitting means for transmitting pulses, said means having a first frequency control input;
   radar receiving means for receiving said pulses as echo pulses reflected by targets, said receiving means having a second frequency control input;
   a listening-in receiver having a third frequency control input and a first output;
   storing means having a gated input having a signal terminal and a control terminal, and a second output coupled to said first and second frequency control inputs;
   a controlled random signal generator having a control input coupled to said first output and an output coupled to said third frequency control input and to said signal terminal;
   and radar synchronizing means having a first, a second and a third control outputs respectively coupled to said generator control input, to said control terminal and to said transmitting means.

4. A pulse radar system with a pulse repetition period To, comprising:
   radar transmitting means having a transmission control input and a first frequency control input; radar receiving means, having a second frequency control input; listening in receiving means having a third frequency control input and a first output;
   storing means having a fourth control input, a first signal input, and an output, coupled to said first and second frequency control inputs;
   a variable signal generator having a fifth control input coupled to said first output and a sixth control input, and an output coupled to said third frequency control input and to said first signal input;
   and radar synchronizing signal generator means, having an output supplying signals of said repetition period To, coupled to said transmission control input, to said fourth control input and to said sixth control input.

5. A pulse radar system of pulse repetition period To, comprising:
   radar transmitting means including first oscillator means having a first frequency control input and an oscillation control input; radar receiving means operating at a given intermediate frequency and including second oscillator means having a second frequency control input; listening-in receiving means including third oscillator means having a third frequency control input and a threshold device having a level control input and a pulsed output;
   storing means having a first gated control input, a first signal input, and a first output coupled to said first and second frequency control inputs;
   variable signal cyclic generator of period T, smaller than To, having a second gated control input coupled to said pulsed output, a cycle control input and a second output coupled to said third frequency control input and to said first signal input;
   radar synchronising signal generator means having a general output coupled to said cycle control input, said output supplying signals of said repetition period To;
   threshold level adjusting means having a first input, a second input coupled to said pulsed output and an output coupled to said level control input;
   and synchronizing means having an input coupled to said general output, a first output coupled to said level adjusting means first input, and a second output coupled to said first gated control input and to said oscillation control input for successively making operative said adjusting means, and said gated input and transmitting means.

6. A pulse radar system according to claim 5 wherein said listening-in means further comprises two intermediate frequency amplifier stages centered on respective intermediate frequencies differing by twice the intermediate frequency of said radar receiver, and a weighting circuit coupled between said two channels and said threshold device.

7. A pulse radar system of pulse repetition period To, comprising:
   radar transmitting means having a radar transmission initiating input and including first oscillator means having a first frequency control input and an oscillation control input;
   radar receiving means, including second oscillator means having a second frequency control input;

listening-in receiving means including third oscillator means having a third frequency control input and a threshold device having a level control input and a pulsed output;

storing means having a first gated control input, a first signal input, and a first output coupled to said first and second frequency control inputs;

variable signal cyclic generator of period T, smaller than To, having a second gated control input coupled to said pulsed output, a cycle control input, and an output coupled to said third frequency control input and to said first signal input;

radar synchronising signal generator means having a general output coupled to said cycle control input, said output supplying signals of said repetition period To;

first delaying means, coupled to said general output, having an output coupled to said radar transmission initiating input, said delaying means imparting a delay $\tau$ greater than T and smaller than To;

first control means having an input and an output coupled to said first gated control input for applying thereto control signals of duration $\theta_2$ smaller than T and such that $\tau > T + \theta_2$;

second control means having an actuating input, a resetting input coupled to said first delaying means output and an output coupled to said oscillation control input;

second delaying means having an input coupled to said general output and an output coupled to said input and actuating input of said first and second control means, said second delaying means imparting a delay T;

pulse modulating means having a control input coupled to said general output and an output, supplying signals at a repetition period smaller than $\theta_2$, coupled to said gated pulsed output;

a threshold control device having a first and a second level adjusting input and an output coupled to said level control input;

level raising means having a control input coupled to said general output, a signal input coupled to said pulsed output, and an output coupled to said first level adjusting input;

and level lowering means having a signal input coupled to said second delaying means output, a first control input coupled to said pulsed output, and a second control input coupled to said general output, and an output coupled to said second level adjusting input.

8. A pulse radar system of pulse repetition period To, comprising: radar transmitting means including first oscillator means having a first frequency control input and an oscillation control input; radar receiving means including second oscillator means having a second frequency control input;

listening in receiving means including third oscillator means having a third frequency control input and a threshold device having a level control input and a pulsed output;

storing means having a first gated control input, a first signal input, and a first output coupled to said first and second frequency control inputs;

variable signals cyclic generator of period T, smaller than To, having a second gated control input coupled to said pulsed output, a cycle control input and a second output coupled to said third frequency control input and to said first signal input;

radar synchronising signals generator means having a general output coupled to said cycle control input, siad output supplying signals of said repetition period To;

a threshold control device having a threshold level raising input, a threshold level lowering input, and an output coupled to said level control input, said threshold control device comprising a first set of n gates, numbered to 1 to n, and a second set of n gates, said gates of said first and second sets having respective opening control inputs, respective closing control inputs, respective signal inputs and respective outputs, said signal inputs of said first set being coupled in parallel to said level raising input, said signal inputs of said second set being coupled in parallel to said level lowering input, the opening control input and the closing control input of the $i^{th}$ gate of any of said sets, with i=2 to n, being coupled respectively to the output of the $(i-1)^{th}$ gates of same and of the other set, the opening control inputs of the first gate of the first set being coupled to said level raising input, the closing control input of said last mentioned gate being coupled to said level lowering input and conversely for the first gate of the second set, (n + 1) bistable multivibrators, numbered 0 to n having respective tripping inputs, respective resetting inputs and respective outputs, the tripping input and the resetting input of the $j^{th}$ multivibrator with j = 1 to n, being coupled respectively to the outputs of the $j^{th}$ gates of said first set and said second sets, the tripping and resetting inputs of the first multivibrator being coupled respectively said level raising and lowering inputs, and a summing device having (n + 1) inputs respectively coupled to said outputs of said multivibrators and an output coupled to said threshold control device output;

level raising means having a control input, a signal input coupled to said pulsed output and an output coupled to said level raising input;

level lowering means having a signal input, a first control input coupled to said pulsed output, a second control input, and an output coupled to said level lowering limit;

first control means having an input coupled to said general output, a first, a second and a third output, said first output being coupled to said control input of said level raising means, said second output being coupled to said second control input of said level lowering means, said third output being coupled to said oscillation control input for applying thereto respective control signals initiated at the same predetermined instant of said radar cycle after successive time intervals have elapsed and having respectively a first duration and a second duration shorter than said first duration, second control means having an input coupled to said general output and an output coupled to said control input of said level raising means, said first and second control means applying to said control inputs of said level raising and lowering means respective signals during respective and successive time intervals of said radar cycles, and pulse modulator means having an input coupled to said general output and an output coupled to said second gated control input and to said signal input of said level lowering means for supplying thereto periodic signals having a repetition period much smaller than To and being a submultiple of T.

* * * * *